US012785465B2

(12) United States Patent
Favre et al.

(10) Patent No.: US 12,785,465 B2
(45) Date of Patent: Nov. 3, 2026

(54) STATOR WITH CLOSED SLOTS WITH CONTINUOUS WINDING FOR AN ELECTRIC MACHINE AND PROCESS FOR MAKING SUCH STATOR

(71) Applicant: MAVEL EDT S.P.A., Pont Saint Martin Aosta (IT)

(72) Inventors: Luca Favre, Pont Saint Martin Aosta (IT); Davide Bettoni, Pont Saint Martin Aosta (IT)

(73) Assignee: MAVEL EDT S.P.A., Pont Saint Martin Aosta (IT)

(*) Notice: Subject to any disclaimer, the term of this patent is extended or adjusted under 35 U.S.C. 154(b) by 187 days.

(21) Appl. No.: 18/267,018

(22) PCT Filed: Dec. 31, 2020

(86) PCT No.: PCT/IT2020/000090

§ 371 (c)(1),
(2) Date: Jun. 13, 2023

(87) PCT Pub. No.: WO2022/144934

PCT Pub. Date: Jul. 7, 2022

(65) Prior Publication Data

US 2024/0313590 A1 Sep. 19, 2024

(51) Int. Cl.

| | |
|---|---|
| ***H02K 1/16*** | (2006.01) |
| ***H02K 1/20*** | (2006.01) |
| ***H02K 3/487*** | (2006.01) |
| ***H02K 15/026*** | (2025.01) |
| ***H02K 15/062*** | (2025.01) |

(52) U.S. Cl.
CPC ............... *H02K 1/165* (2013.01); *H02K 1/20* (2013.01); *H02K 3/487* (2013.01); *H02K 15/026* (2013.01); *H02K 15/062* (2013.01)

(58) Field of Classification Search
CPC .......... H02K 1/165; H02K 3/487; H02K 1/20; H02K 3/24; H02K 15/026; H02K 15/062
See application file for complete search history.

(56) References Cited

U.S. PATENT DOCUMENTS

| | | | | |
|---|---|---|---|---|
| 7,049,725 B2* | 5/2006 | Blouin | H02K 1/165 310/216.012 |
| 2005/0082924 A1* | 4/2005 | Fukasaku | H02K 15/0433 310/198 |
| 2010/0320864 A1* | 12/2010 | Rahman | H02K 3/12 310/201 |

(Continued)

*Primary Examiner* — Leda T Pham
(74) *Attorney, Agent, or Firm* — Flener IP & Business Law

(57) ABSTRACT

A stator with closed slots with continuous winding is described, comprising a first internal stator part (25) which comprises a plurality of longitudinal teeth (26), spaced by a space (27) configured to form the lower part of the closed slots (14) of the stator, a second external annular stator part (35), comprising a plurality of seats (36) complementary to the teeth (26) of the first stator part (25) and configured to fit together with the teeth (26) so as to form the closed slots (14) and the stator (15), a continuous winding comprising at least one strap (11, 21, 31) configured to be wound on the first internal stator part (25) in the spaces (27) between the teeth (26) in which at least one slot (14) is asymmetrical; a process for manufacturing the stator (15) and an electric machine comprising the stator (15) are also described.

10 Claims, 7 Drawing Sheets

(56) References Cited

U.S. PATENT DOCUMENTS

| | | | | |
|---|---|---|---|---|
| 2016/0056696 | A1* | 2/2016 | Ito | H02K 3/12 29/596 |
| 2018/0287436 | A1* | 10/2018 | Xu | H02K 1/146 |
| 2019/0115794 | A1* | 4/2019 | Liang | H02K 1/02 |

* cited by examiner

STATOR WITH CLOSED SLOTS WITH CONTINUOUS WINDING FOR AN ELECTRIC MACHINE AND PROCESS FOR MAKING SUCH STATOR

BACKGROUND OF THE INVENTION

1) Field of the Invention

The present invention relates to a stator for an electric machine with continuous winding and to a process for manufacturing such a stator.

In particular, the invention refers to a stator for a closed-slot rotating electric machine comprising a continuous winding made using a metal blade.

2) Background Art

Known electric machines include a fixed part, the stator, and a moving part, the rotor, coaxially arranged one inside the other. Typically, the rotor comprises a pack of laminations fixed on a rotation shaft, and is inserted inside the stator which includes an electric winding capable of generating a magnetic field that causes the rotor to rotate.

The stator is generally annular in shape and includes a plurality of radial slots, inside which the electric winding is obtained.

From International Patent Application WO2016188764, an electric machine with a stator with closed slots is known, for example a synchronous electric motor with reluctance assisted by permanent magnets, which provides a wall for closing the stator slots in correspondence with the rotor, to make closed slots that reduce the problems caused by torque ripple, with associated vibrations and noise.

For the realization of the electric windings of closed-slot stators, it is known to use electric conductors made using strips or continuous wires, or copper strips that are bent in the central part to form hairpin-shaped strips, to be inserted in the stator slots.

The shape and bending angles of the strips vary with the variation of the geometry of the stator and the slots, and with the variation of the winding scheme.

These strips are inserted into the stator slots according to a certain pattern, to obtain the exact number of turns necessary to compose the stator winding.

Known stators comprising windings made through the use of hairpins or windings made using strips or wires in a single piece, have a series of problems caused by the complexity of the process, which makes it difficult to insert the conductors into the stator slots, in particular in closed slots, preventing optimal filling of the slots by the winding.

SUMMARY OF THE INVENTION

Object of the present invention is solving these problems by means of a stator with closed slots with continuous winding for an electric machine and a process for making this stator, which allow obtaining a better efficiency of the electric machine by realizing windings with greater active length, lower costs, better filling of the slots by the winding, also simplifying the production process.

The aforementioned and other objects and advantages of the invention, which will appear from the following description, are achieved with a closed-slot stator with continuous winding for an electric machine and a process for manufacturing such a stator, as those described in the independent claims.

Preferred embodiments and non-trivial variants of the present invention are the subject matter of the dependent claims.

It is understood that all attached claims form an integral part of the present description.

It will be immediately obvious that innumerable variations and modifications (for example relating to shape, dimensions, arrangements and parts with equivalent functionality) can be made to what is described, without departing from the scope of the invention as appears from the attached claims.

BRIEF DESCRIPTION OF THE DRAWINGS

The present invention will be better described by some preferred embodiments thereof, provided as a non-limiting example, with reference to the attached drawings, in which.

DETAILED DESCRIPTION OF PREFERRED EMBODIMENTS

Figure 1:
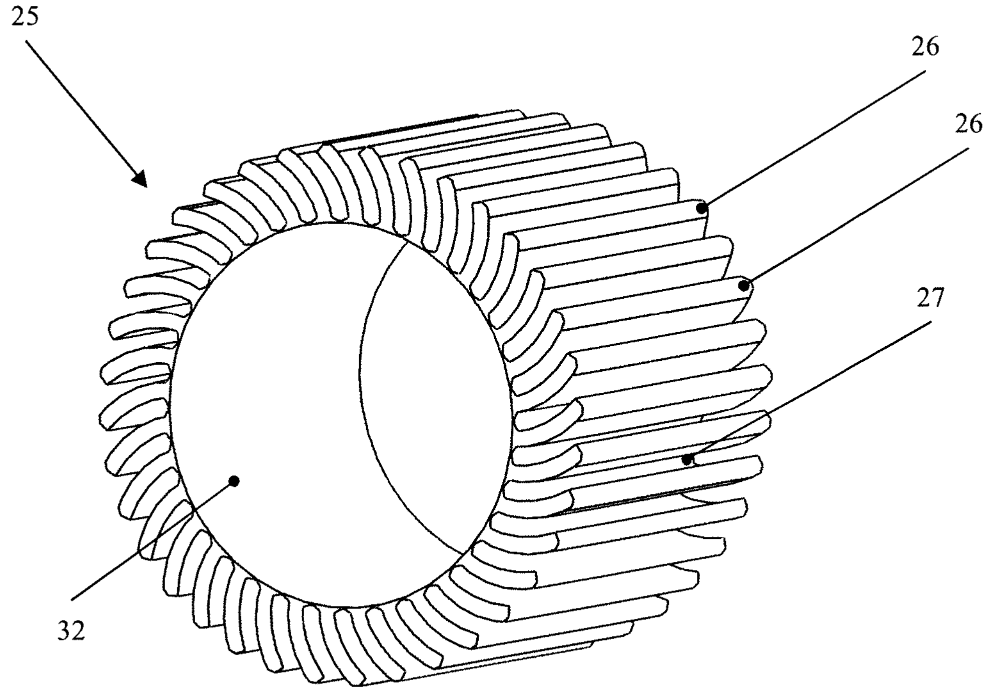
FIG. 1 shows a perspective view of an internal part of a stator of an electric machine according to the invention.
Figure 2:
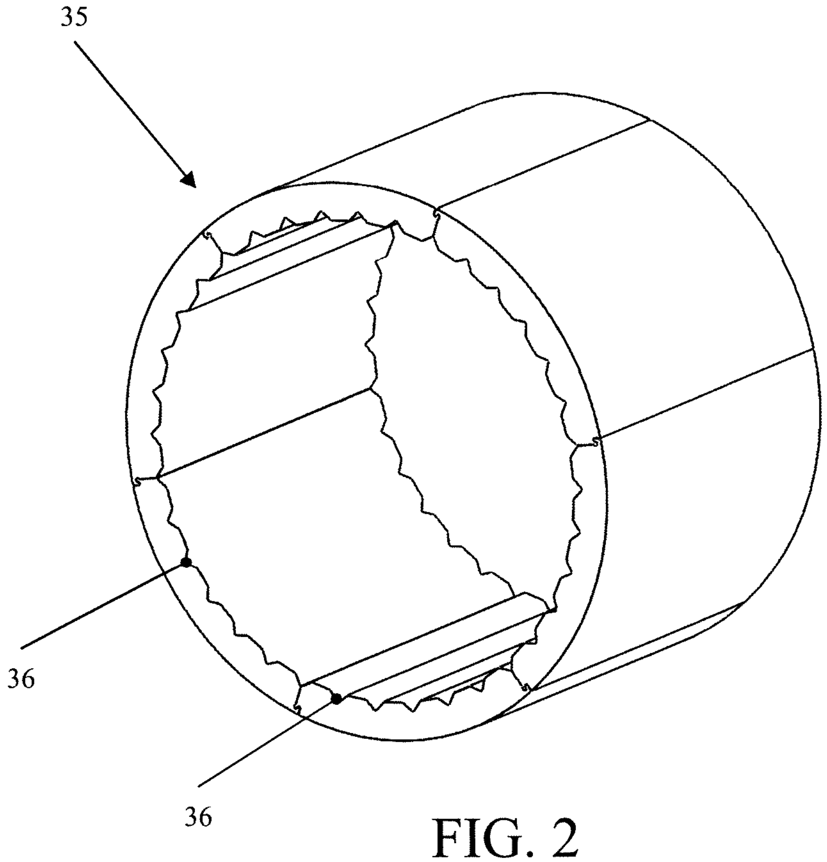
FIG. 2 shows a perspective view of an external part of a stator of an electric machine according to the invention.
Figure 3:
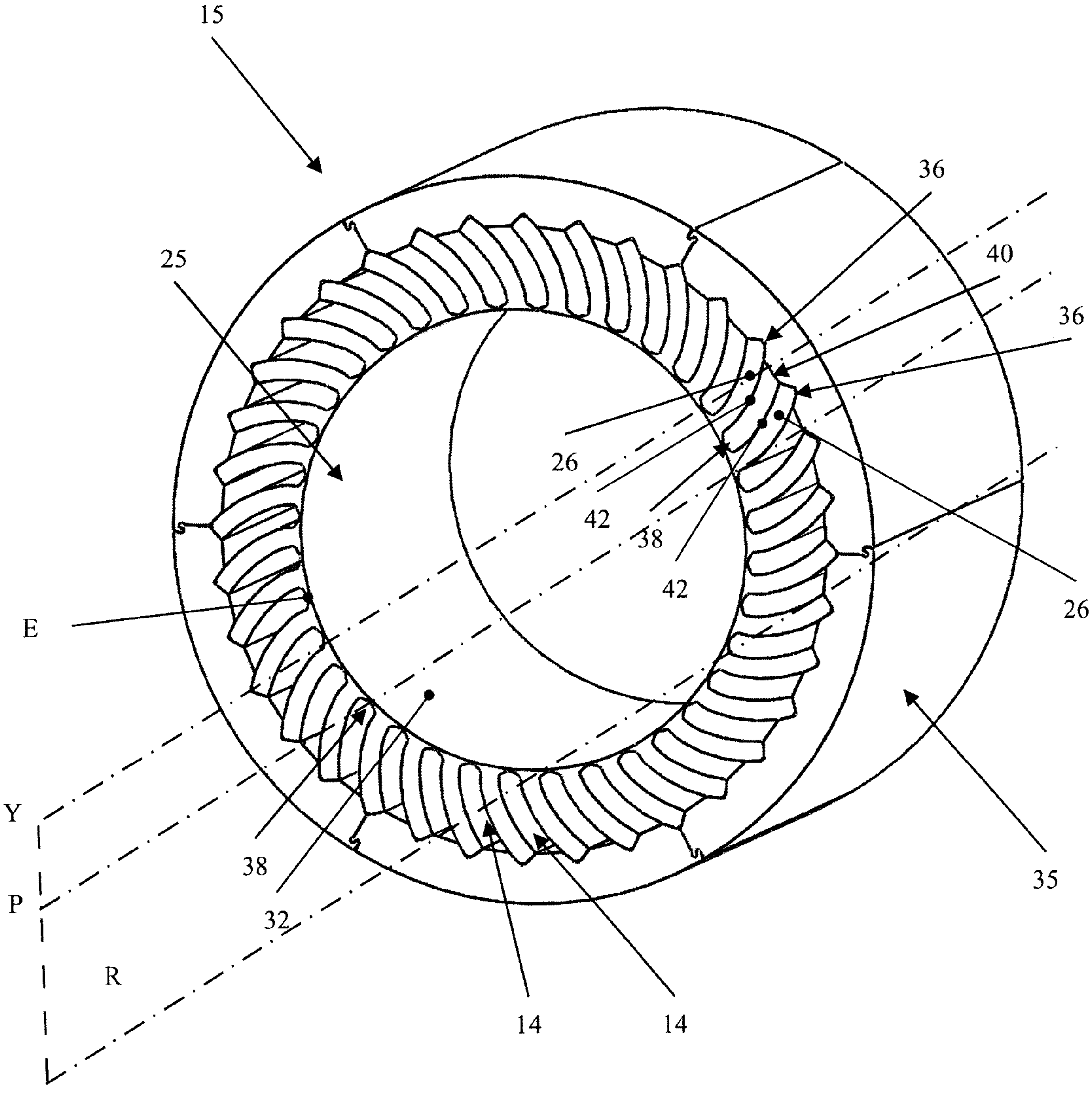
FIG. 3 shows a perspective view of a stator of an electric machine according to the invention.
Figure 4:
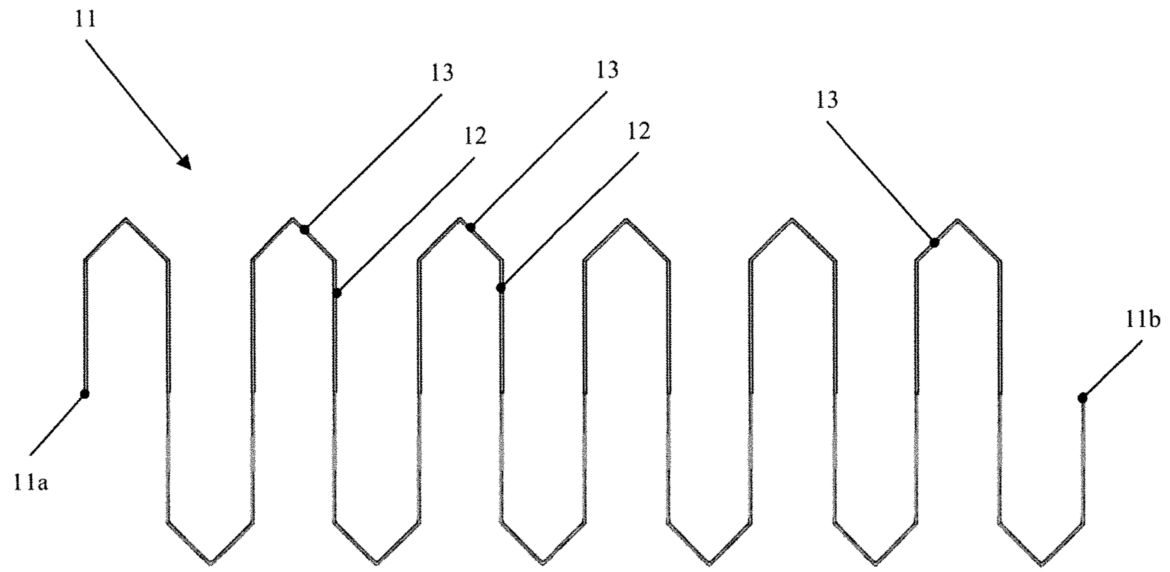
FIG. 4 shows a view of a continuous winding for a stator of an electric machine according to the invention.
Figure 5:
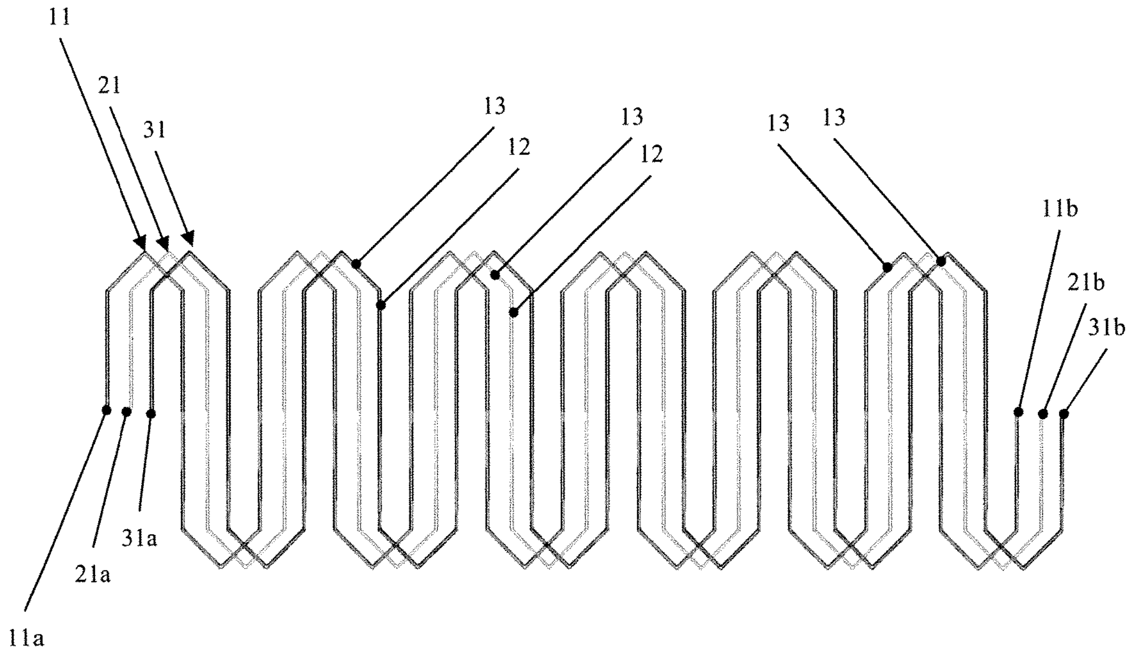
FIG. 5 shows a view of a plurality of continuous windings for a stator of an electric machine according to the invention.
Figure 6:
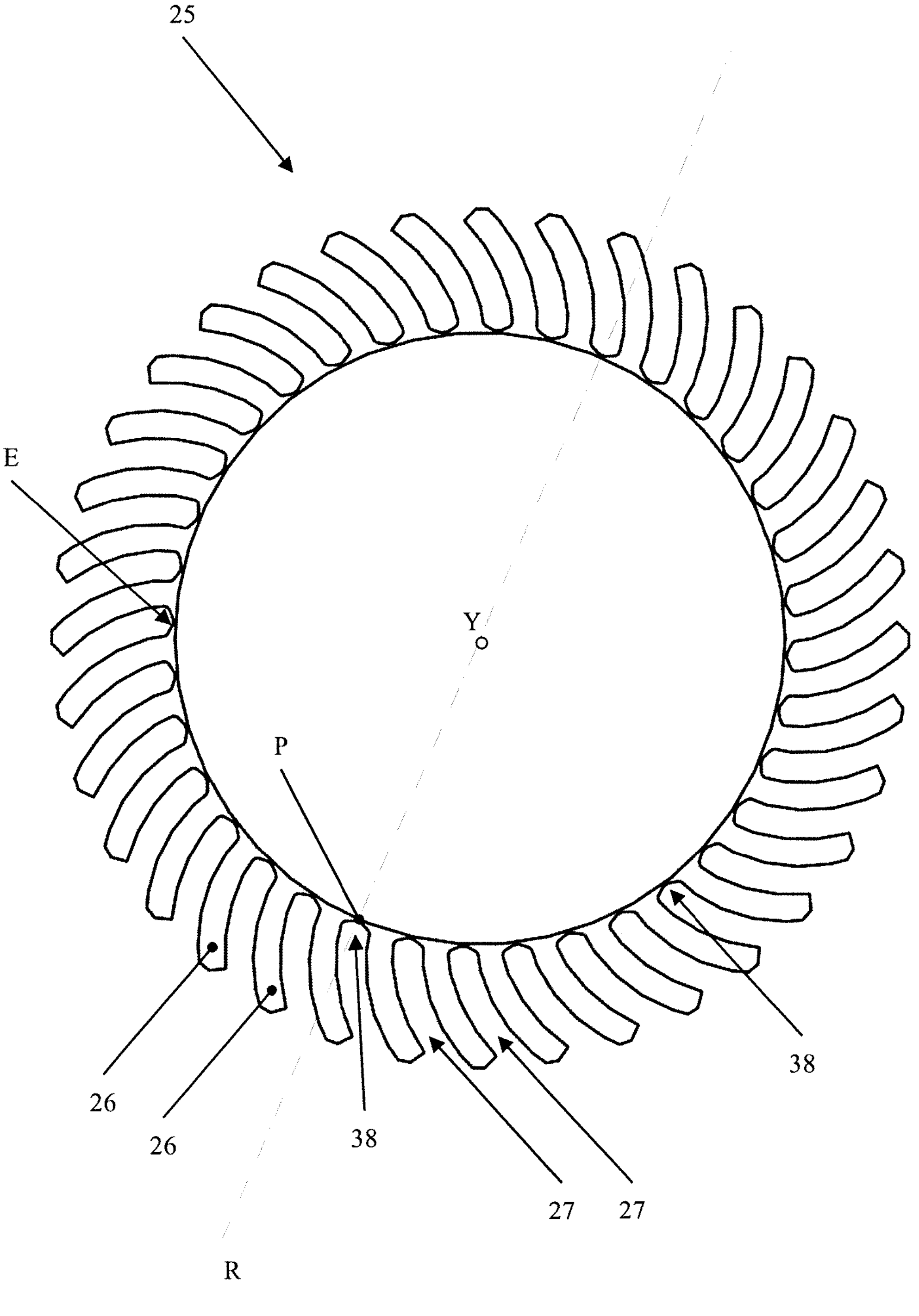
FIG. 6 shows a schematic front view of an internal part of a stator according to the invention.
Figure 7:
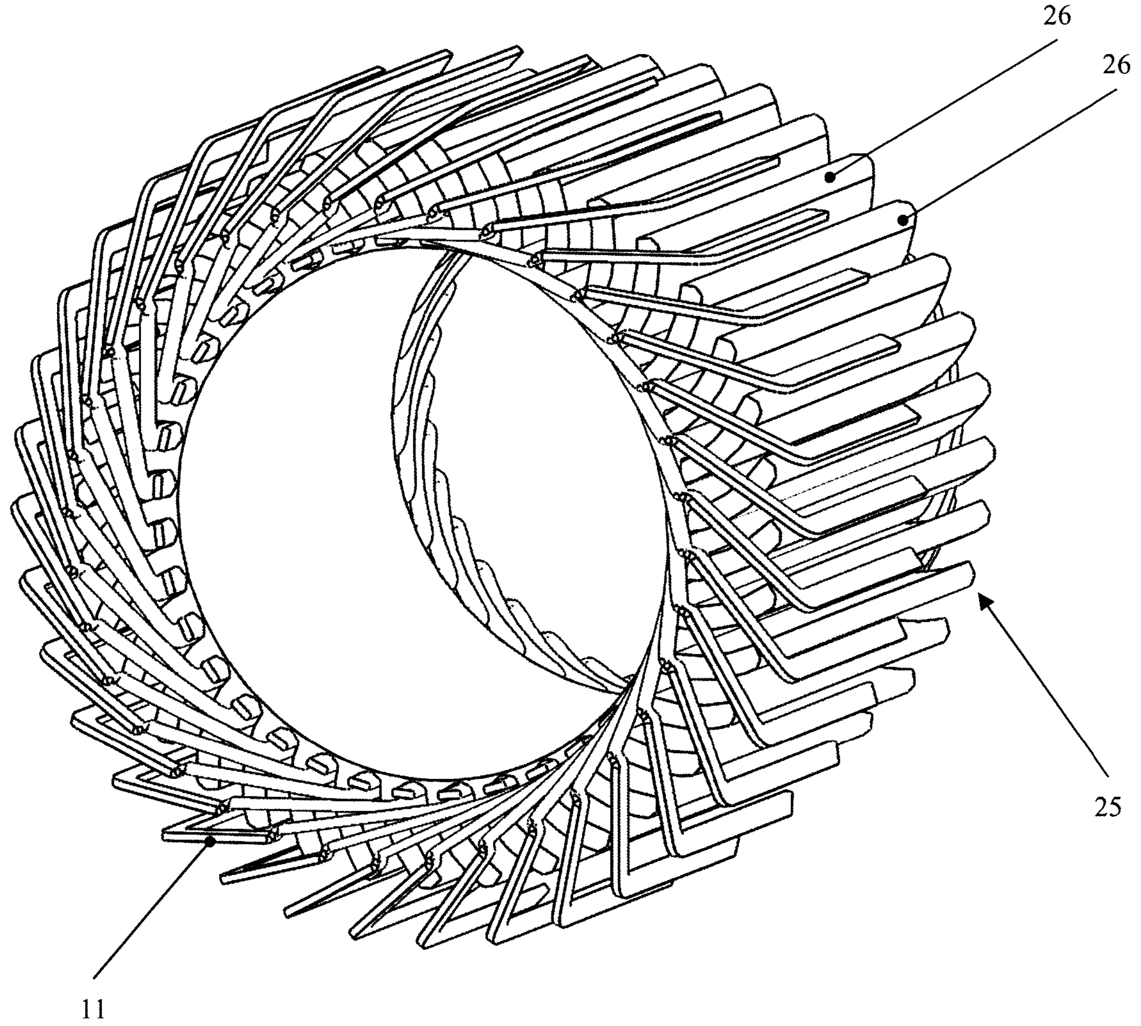
FIG. 7 shows a perspective view of an internal part of a stator with a continuous winding according to the invention.
Figure 8:
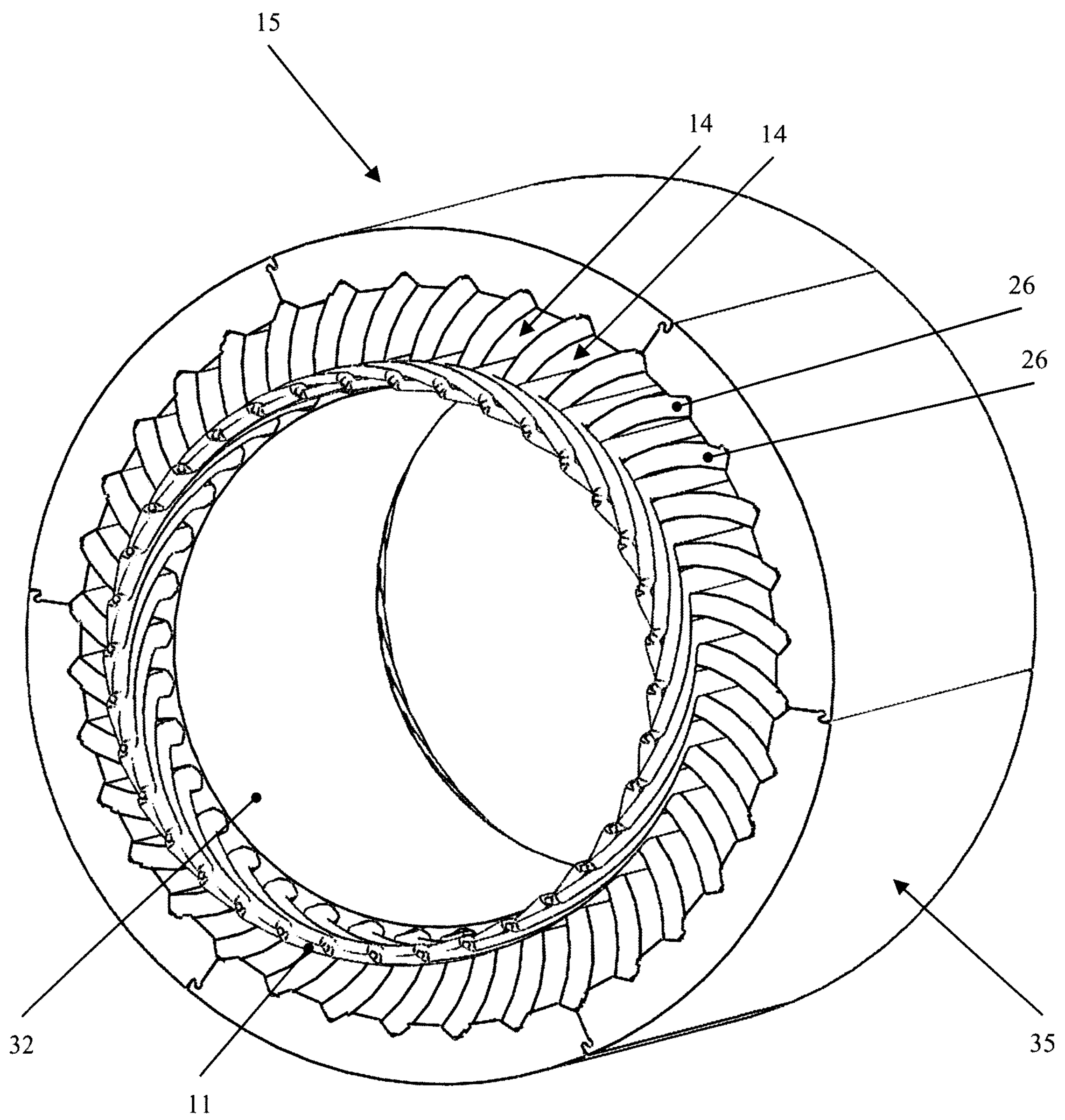
FIG. 8 shows a perspective view of a stator of an electric machine with a continuous winding according to the invention.
Figure 9:
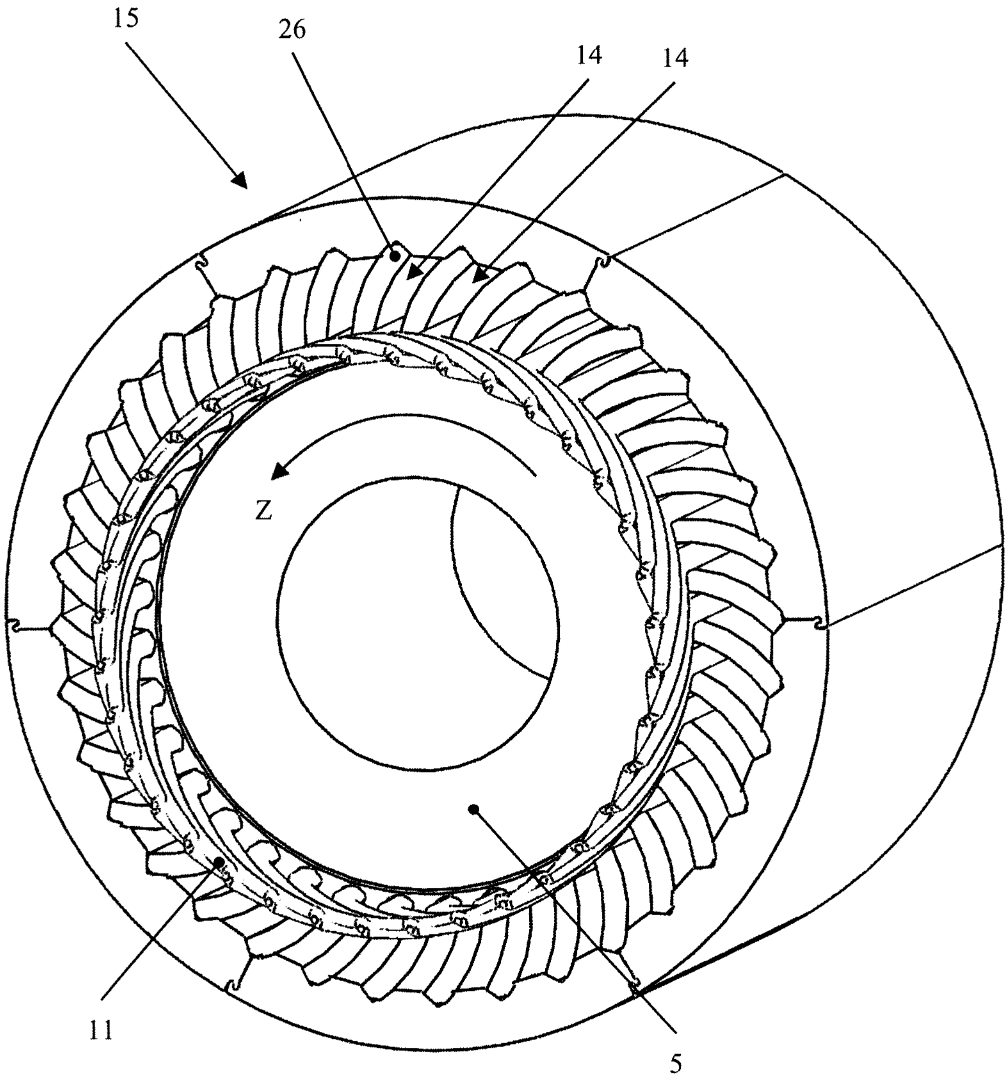
FIG. 9 shows a perspective view of a rotor and a stator of an electric machine with a continuous winding according to the invention.

With reference to the figures, the stator 15 with closed slots with continuous winding will be described below for an electric machine according to the invention, which comprises a first internal stator part 25 comprising a plurality of longitudinal teeth 26, spaced apart by a configured space 27 to make the lower part of the closed slots 14 of the stator, and a second external stator part 35, comprising a plurality of seats 36 annular complementary to the teeth 26 of the first stator part 25 and configured to fit together with the first stator part 25, in order to form the closed slots 14 and the stator 15; in particular, the seats 36 obtained in the second stator part 35 are configured to fit together with the teeth 26 of the first stator part 25, in order to form a plurality of closed slots 14 of the stator, by means of a reciprocal sliding movement of the first internal stator part 25 and of the second external part 35, for example along the direction of the longitudinal Y axis of the stator 15, realizing a coupling, for example dovetail-type or other known type of coupling.

The closed slots 14 are arranged, preferably equidistant from each other, along a cylindrical internal wall 32 of the stator 15 configured to house a rotor 5, and each slot 14 comprises a bottom wall 38 arranged in the direction of the longitudinal Y axis of the stator 15, in proximity of the inner wall 32 at a distance E from the inner wall 32.

The slots 14 are arranged along the direction of the longitudinal Y axis of the stator 15 and have an asymmetrical conformation with respect to a plane R passing through the longitudinal Y axis of the stator 15 and for a centreline P of the slot 14 in correspondence with the internal wall. 32; preferably, the slots 14 have an asymmetrical conformation with respect to a plane R passing through the longitudinal Y axis of the stator 15 and through a centreline P of the bottom wall 38.

Each closed slot 14 of the stator 15 is formed by two side walls 42 of two adjacent teeth 26 made in the first internal stator part 25, by the bottom wall 38 connecting the two adjacent teeth 26 and by an upper wall 40 formed by a wall for connecting two adjacent seats 36 made in the second external stator part 35; for example, the bottom wall 38 has a semi-circular or arched shape.

In a preferred embodiment of the invention, the side walls 42 of a slot 14 are asymmetrical, in particular with respect to the plane R; preferably, the side walls 42 of the groove are curved or concave, and more preferably have the concavity made in such a way as to optimize the efficiency or operation of the electric machine in a desired operating direction; for example, the concavity faces in a specific direction with respect to a preferred rotation direction Z of the rotor 5.

The stator 15 with closed slots of the invention comprises a continuous winding comprising at least one strip 11, 21, 31, which in turn comprises a plurality of first sectors 12 connected to each other by a plurality of second sectors 13 alternating with them, the at least one strip 11, 21, 31 being configured to be wound on the first internal stator part 25, positioning the first sectors 12 of the strip 11, 21, 31 in the spaces 27 between the teeth 26. Preferably, the first sectors 12 are parallel, each first sector 12 being connected with at least one end thereof to a second sector 13, and the winding comprises three strips 11, 21, 31 alternating with each other.

In a preferred embodiment of the stator 15 with closed slots according to the invention, the second external annular stator part 35 is composed of sectors interlocked, for example by providing a guide that allows the sectors to be assembled by making them slide in the direction of longitudinal Y axis of the stator 15.

The process for making a closed-slot stator with continuous winding according to the invention includes the following steps:

- a step of bending, on a plane, at least one strip to make at least one strip 11, 21, 31 in a single piece, typically a strip 11, 21, 31 for each electric phase, for example three strips 11, 21, 31 in case of a three-phase current, each strip 11, 21, 31 comprising a plurality of first sectors 12, preferably equal in shape and size and parallel to each other, preferably substantially straight, configured to be inserted inside closed slots 14 of one stator 15 and connected to each other by a plurality of second bending sectors 13, preferably identical to each other in shape and size, and configured to remain outside the closed slots 14 of the stator 15; in particular, the first sectors 12 and the second sectors 13 are alternated with each other, each first sector 12 being connected with at least one end thereof to a second sector 13, preferably the two ends of each first sector 12 being connected to two different second sectors 13. Preferably, the section of each strip 11, 21, 31 has the shape of the section of the closed slots 14 of the stator 15 so that, once inserted into the closed slots 14, the strip 11, 21, 31 maximizes its filling;
- a step for preparing the stator 15, the stator 15 comprising a first internal stator part 25 comprising a plurality of longitudinal teeth 26, spaced apart by a space 27 configured to form the lower part of the closed slots 14 of the stator, and a second part 35 of an external annular stator, comprising a plurality of seats 36 complementary to the teeth 26 of the first stator part 25 and configured to fit together with the first stator part 25 so as to form the closed slots 14 and the stator 15; in particular, the seats 36 obtained in the second stator part 35 are configured to fit together with the teeth 26 of the first stator part 25 so as to form the closed slots 14 of the stator, by means of a reciprocal sliding movement of the first internal stator part 25 and of the second external part 35, for example in the direction of the axis of the stator 15, realizing a coupling, for example a dovetail-type or other known type of coupling;
- a step of carrying out the winding on the first internal stator part 25 of the at least one strip 11, 21, 31, preferably of the three strips 11, 21, 31 alternating with each other, positioning the first sectors 12 of strip 11, 21, 31 in the spaces 27 between the teeth 26; in particular, the strip 11, 21, 31 is wound on the first stator part 25 so as to mesh it between the teeth 26 of the first internal stator part 25 similarly to how a chain is engaged on the teeth of a gear, by means of a relative rotation of the first internal stator part 25 with respect to the strip 11, 21, 31; in particular, the number of rotations is equal to the number of turns of a slot; during this rotation the curved or concave shape of the side walls 42 of the teeth 26 facilitates the insertion of the strap 11, 21, 31 in the closed slots 14, in order to fill them optimally;
- a step of connecting step, preferably by welding, the two free ends 11*a* and 11*b*, 21*a* and 21*b*, 31*a* and 31*b* of each strip 11, 21, 31;
- a step of isolating the welds in a known way, for example by means of epoxy deposited by dripping;
- a step of positioning the second external stator part 35 on the first internal stator part 25 so that the seats 36 obtained in the second external stator part 35, by engaging with the teeth 26 of the first internal stator part 25, form the slots 14 closed of the stator 15;
- a phase of verifying the absence of connection errors, welding or short circuit problems between the different electric phases;
- a resin phase, by immersion of the ends of the strips 11, 21, 31 that protrude from the closed slots 14 and of the heads of the stator 15 into a resin configured to make the stator 15 and the strips 11, 21, 31 integral with each other avoiding future damages due to vibrations.

Advantageously, the stator with closed slots with continuous winding for an electric machine and the process for making this stator according to the invention allow making windings with lower costs, better filling of the slots by the winding, also simplifying the production process.

In addition, the closed-slot stator with continuous winding for an electric machine of the invention allows optimizing the efficiency or operation of an electric machine in a desired operating direction.

The invention claimed is:

1. A stator with a plurality of closed slots with continuous winding comprising:

- a first internal stator part which comprises a plurality of longitudinal teeth, adjacent ones of the plurality of teeth are spaced apart by a respective space configured to form a lower part of a corresponding closed slot of the stator;
- a second external annular stator part, comprising a plurality of seats complementary to the plurality of teeth of the first internal stator part and configured to fit together with the plurality of teeth so as to form the plurality of closed slots and the stator;

a continuous winding comprising at least one strip configured to be wound on the first internal stator part in the spaces comprised between the plurality of teeth, wherein each of the plurality of closed slots has an asymmetrical conformation with respect to a plane passing through a longitudinal axis of the stator and through a centreline of the respective closed slot in correspondence with a cylindrical internal wall of the stator configured to house a rotor, wherein each of the plurality of closed slots is defined by opposing asymmetrical side walls of adjacent teeth, and all of the asymmetrical side walls are curved or concave in a same direction so as to be substantially parallel with one another.

2. The stator of claim 1, wherein the plurality of closed slots is arranged along an internal wall of the stator configured to house the rotor, and each closed slot is further defined by a bottom wall arranged in a direction of a longitudinal axis of the stator, in proximity to the inner wall.

3. The stator of claim 2, wherein the plurality of closed slots and/or the asymmetrical side walls have an asymmetrical conformation with respect to a plane passing through the longitudinal axis of the stator and through a centreline of the bottom wall.

4. The stator of claim 1, comprising at least one strip comprising a plurality of first sectors connected together by a plurality of second sectors alternating with them, the at least one strip being configured to be wound on the first part of the internal stator by positioning the first sectors in the spaces between the teeth.

5. The stator of claim 1, wherein the second external annular stator part is composed of interlocked sectors.

6. A process for manufacturing the stator of claim 1, the process comprising the following steps:

a step of folding on a plane of at least one strip to make at least one strip in a single piece, the strip comprising a plurality of first sectors configured to be inserted inside closed slots of a stator and connected to each other by a plurality of second bending sectors configured to remain outside the closed slots of the stator;

a step of preparing the stator, the stator comprising a first internal stator part comprising a plurality of longitudinal teeth, spaced apart by a space configured to form the lower part of the closed slots of the stator, and a second external annular stator part, comprising a plurality of seats complementary to the teeth of the first stator part and configured to fit together with the first stator part so as to form the closed slots and the stator;

a step of making the winding on the first internal stator part of the at least one strip, positioning the first sectors of the strip in the spaces included between the teeth;

a step of connecting two free ends of each strip.

7. An electric machine comprising the stator of claim 1.

8. A stator with a plurality of closed slots with continuous winding comprising:

a first internal stator part which comprises a plurality of longitudinal teeth, adjacent ones of the plurality of teeth are spaced apart by a respective space configured to form a lower part of a corresponding closed slot of the stator;

a second external annular stator part, comprising a plurality of seats complementary to the plurality of teeth of the first internal stator part and configured to fit together with the plurality of teeth so as to form the plurality of closed slots and the stator;

a continuous winding comprising at least one strip configured to be wound on the first internal stator part in the spaces comprised between the plurality of teeth, wherein each of the plurality of closed slots is asymmetrical and is defined by opposing asymmetrical side walls of adjacent teeth, wherein all of the asymmetrical side walls are curved or concave in a same direction so as to be substantially parallel with one another, and wherein all of the asymmetrical side walls have a concavity facing along a specific direction with respect to a preferred direction of rotation of a rotor that the stator is configured to house.

9. A stator with a plurality of closed slots with continuous winding comprising:

a first internal stator part which comprises a plurality of longitudinal teeth, adjacent ones of the plurality of teeth are spaced apart by a respective space configured to form a lower part of a corresponding closed slot of the stator;

a second external annular stator part, comprising a plurality of seats complementary to the plurality of teeth of the first internal stator part and configured to fit together with the plurality of teeth so as to form the plurality of closed slots and the stator;

a continuous winding comprising at least one strip configured to be wound on the first internal stator part in the spaces comprised between the plurality of teeth, wherein each of the plurality of closed slots is asymmetrical and is defined by opposing asymmetrical side walls of adjacent teeth, and wherein each of said asymmetrical side walls has a continuous curvature in a same direction along an entire length thereof so as to be substantially parallel with one another.

10. The stator of claim 9, wherein all of the asymmetrical side walls have a concavity facing along a specific direction with respect to a preferred direction of rotation of a rotor that the stator is configured to house.

* * * * *